US011369943B2

(12) United States Patent
Fang et al.

(10) Patent No.: US 11,369,943 B2
(45) Date of Patent: Jun. 28, 2022

(54) STARCH-BASED CARBON COMPOSITE AND USE THEREOF IN SELECTIVE AND EFFICIENT ADSORPTION OF MERCURY ION AND METHYLENE BLUE

(71) Applicant: Qilu University of Technology, Jinan (CN)

(72) Inventors: Yishan Fang, Jinan (CN); Bo Cui, Jinan (CN); Jiaxuan Ma, Jinan (CN); Zhiying Li, Jinan (CN); Chunjing Tao, Jinan (CN); Haiteng Tao, Jinan (CN)

(73) Assignee: QILU UNIVERSITY OF TECHNOLOGY, Jinan (CN)

( * ) Notice: Subject to any disclaimer, the term of this patent is extended or adjusted under 35 U.S.C. 154(b) by 7 days.

(21) Appl. No.: 16/997,877

(22) Filed: Aug. 19, 2020

(65) Prior Publication Data
US 2021/0170361 A1 Jun. 10, 2021

(30) Foreign Application Priority Data

Dec. 10, 2019 (CN) .......................... 201911145874.5

(51) Int. Cl.
*B01J 20/24* (2006.01)
*B01J 20/30* (2006.01)
(Continued)

(52) U.S. Cl.
CPC ........... *B01J 20/24* (2013.01); *B01J 20/3085* (2013.01); *C02F 1/286* (2013.01); *C08B 31/00* (2013.01);
(Continued)

(58) Field of Classification Search
CPC B01D 20/24; B01D 20/3085; B01D 20/3071; B01D 20/3078; B01D 20/3425;
(Continued)

(56) References Cited

U.S. PATENT DOCUMENTS 2,538,903 A * 1/1951 Gaver ..................... C08B 31/00
536/67
2019/0015818 A1* 1/2019 Ghosh ...................... B01J 23/36

FOREIGN PATENT DOCUMENTS

CN 105618004 B 7/2018
CN 109054076 A * 12/2018 ............. B01J 20/24

* cited by examiner

*Primary Examiner* — Magali P Slawski
*Assistant Examiner* — Brad Gordon
(74) *Attorney, Agent, or Firm* — Mintz Levin Cohn Ferris Glovsky and Popeo, P.C.

(57) ABSTRACT

The present invention relates to a method for preparing a simply prepared, safe, nontoxic, and biodegradable modified starch; the present invention further relates to use thereof as an adsorbent in adsorbing heavy metal ions and organic compounds, and belongs to the technical field of modified starch material. Starch is used as raw material and modified with thiourea and tungsten chloride; the starch binds to heavy metal ions through a series of coordination or chelation, and thus produces a heavy metal ion adsorption effect; a starch-based carbon composite is prepared, i.e., a modified starch composite. The simply prepared, environmentally friendly, and recyclable modified starch adsorbent with excellent performance and higher practical value effectively removes He ions and such organic compounds as methylene blue from the wastewater; the modified starch adsorbent is expected to develop into a novel water treatment agent due to low loss rate, biodegradability, and recyclability.

4 Claims, 2 Drawing Sheets

(51) Int. Cl.
     *C08B 31/00*     (2006.01)
     *C02F 1/28*     (2006.01)
     *C02F 101/20*     (2006.01)
     *C02F 101/30*     (2006.01)
     *C02F 101/36*     (2006.01)
     *C02F 101/38*     (2006.01)

(52) U.S. Cl.
     CPC .... *C02F 2101/20* (2013.01); *C02F 2101/308* (2013.01); *C02F 2101/36* (2013.01); *C02F 2101/38* (2013.01); *C02F 2101/40* (2013.01)

(58) Field of Classification Search
     CPC ...... B01D 20/22; C02F 1/286; C02F 2101/20; C02F 2101/308; C02F 2101/36; C02F 2101/38; C02F 2101/40; C02F 1/288; C02F 2101/30; C02F 2303/16; C08B 31/00; C08L 3/02; C08J 2303/02
     See application file for complete search history.

STARCH-BASED CARBON COMPOSITE AND USE THEREOF IN SELECTIVE AND EFFICIENT ADSORPTION OF MERCURY ION AND METHYLENE BLUE

CROSS-REFERENCE TO RELATED APPLICATIONS

The present application claims priority to the Chinese Patent Application No. 201911145874.5 entitled "STARCH-BASED CARBON COMPOSITE AND USE THEREOF IN SELECTIVE AND EFFICIENT ADSORPTION OF MERCURY ION AND METHYLENE BLUE", filed on Dec. 10, 2019, and incorporates its disclosure herein by reference in its entirety.

TECHNICAL FIELD

The present invention relates to a starch-based carbon composite, and in particular to a method for preparing simple, safe, nontoxic, and biodegradable modified starch; the present invention further relates to use thereof as an adsorbent in adsorbing heavy metal ions and organic compounds, and belongs to the technical field of modified starch material.

BACKGROUND

Today, with the development of modern industry and frequent human activities, heavy metal pollution in the ecological environment is on the rise and become a serious threat to human health. Recent research has focused on the investigation of pollution behaviors of heavy metal and the prevention and control thereof.

So far, there have been a lot of studies about how to treat heavy metal ions, of which adsorption method has been widely used because of characteristics of excellent purifying effect, ability of recycling resources, simple operation, practicability, and effectiveness. The key to the adsorption method is to select an excellent adsorbent with rapid adsorption rate, large adsorption capacity, wide scope of ion application, and easy regeneration, but adsorbent preparation method is the key to realize the above excellent effects. Modified starch composite with large specific surface area and adsorption capacity is an excellent adsorbent. However, conventional modified starch is less selective to and has a limited adsorption effect on heavy metal ions; moreover, after use, such modified starch is not biodegradable and recyclable, so as to become an environmental burden and lead to secondary pollution easily. Therefore, it is of great significance in developing an environmentally friendly, novel modified starch material-based adsorbent that adsorbs heavy metal ions.

Most of natural polymers are rich in active functional groups, such as carboxyl, hydroxyl, and amino groups, which adsorb heavy metal ions through electrostatic interaction, coordination, and complexation; moreover, natural polymers feature extensive sources, low price, easy availability, excellent biocompatibility, and biodegradability. Starch is an abundant and renewable natural polymer; modified starch can be prepared from natural starch by a variety of preparation methods, featuring low cost and easy availability. So far, modified starch has been widely used in treating heavy metals in waste water, and there are many reports of preparation of modified starch in order to improve the effect of modified starch on elimination of heavy metals. For example, China Patent CN 109054076 A discloses a preparation method of three-dimensional porous modified starch, an obtained product and application. The preparation method includes the following steps: dispersing starch in water, adding a nano calcium carbonate dispersion solution after heating and gelatinization, and stirring to react, so that the gelatinized starch coats the surfaces of nano calcium carbonate particles; standing after the reaction, and then filtering and washing until the obtained nano calcium carbonate particles coated with the gelatinized starch on the surfaces are dispersed into an ethylene diamine tetraacetic acid (EDTA) solution; stirring well to remove the nano calcium carbonate particles, then washing with water and drying, thus obtaining the three-dimensional porous modified starch. However, this has a poor adsorption effect on mercury ions. China Patent CN201610183803.4 discloses a preparation method of calcium carbonate-based chelate sorbent. The method includes the following steps: mixing the gelatinated modified starch with a coupling agent and calcium carbonate powder, stirring and mixing for 30-50 min at 40-60° C., so as to obtain the calcium carbonate-based chelate sorbent, where the calcium carbonate powder is 400-1,500 mesh in particle size. The patent uses calcium carbonate as matrix and chelates the modified starch with the coupling agent to obtain the sorbent, where the coupling agent plays a role in linking calcium carbonate to chelating starch; final product is a modified starch-calcium carbonate-coupling agent complex. The sorbent simply links the modified starch to calcium carbonate, but fails to form a porous structure; moreover, the sorbent is verified to have better adsorption effects on copper and cadmium ions, but have poor adsorption effects on other metal ions, e.g., mercury and lead ions, with low adsorption capacity of metal ions. In addition, the coupling agent and calcium carbonate in the sorbent fail to fully realize biodegradation and may also pollute the environment.

SUMMARY

To overcome the disadvantages in the prior art, the present invention provides a method for preparing a novel starch-based carbon composite. The method is easy to operate and implement and does not use any coupling agent, and the modified starch obtained thereby features large specific surface area, huge adsorption capacity, and strong selectivity.

The present invention further provides a starch-based carbon composite prepared according to the above method and use thereof as an absorbent in adsorbing heavy metal ions and organic compounds. The starch-based carbon composite provided by the present invention features large adsorption capacity, stable performance, ability to efficiently adsorb a plurality of heavy metal ions and organic pollutants, recyclability, complete biodegradability, eco-friendliness, safety, and higher practical value.

The invention provides the following technical solutions:

A starch-based carbon composite is provided, where raw materials include starch, tungsten chloride, glycerol, and thiourea, and the tungsten chloride, glycerol, starch, and thiourea have an addition ratio of 1 g:40 ml:1 g:0.5 g.

A method for preparing the starch-based carbon composite is provided, including the following steps:

(1) adding glycerol and tungsten chloride to a reactor; after dissolving sufficiently, adding starch and thiourea, and thoroughly stirring until mixed well;

(2) reacting at high temperature;

(3) after cooling, centrifuging and washing to collect precipitates; and (4) drying to obtain modified starch.

The tungsten chloride, glycerol, starch, and thiourea have an addition ratio of 1 g:40 ml:1 g:0.5 g in step (1).

The reaction in step (2) is conducted at 150-250° C. for 5-15 h.

The centrifugation in step (3) is conducted for 20-40 min at 10,000-15,000 rpm.

A drying oven is set at a temperature of 50-80° C. in step (4).

Use of the modified starch as an adsorbent is provided.

The modified starch as adsorbent can efficiently adsorb heavy metal ion $Hg^{2+}$.

The modified starch as adsorbent can efficiently adsorb methylene blue.

Further, the absorbent has an optimal adsorption effect on mercury ions; after adsorption, the absorbent is recyclable. Adsorption capacities of the absorbent to mercury ion and methylene ion are as high as 495 mg/g and 160 mg/g, respectively.

The present invention has the following beneficial effects:

In the present invention, tungsten chloride is dissolved in glycerol and reacted with thiourea and starch at high temperature and pressure to produce a starch-based carbon material rich in oxygen-containing and sulfur-containing groups; the material is coordinated with mercury ions efficiently and highly selectively to realize highly selective and efficient adsorption of mercury ions.

The present invention provides a simple, environmentally friendly, and recyclable modified starch adsorbent with excellent performance and higher practical value effectively; the modified starch adsorbent removes $Hg^{2+}$ ions from the wastewater; the modified starch adsorbent is expected to develop into a novel water treatment agent due to high removal efficiency, large adsorption capacity, low loss rate, and biodegradability; meanwhile, the modified starch adsorbent has an excellent adsorption effect on organic pollutant.

Recycling: Functional starch-based material after adsorption of mercury ions can be recycled by dissolving in 1 M hydrochloric acid, reacting for 1 h under stirring, centrifuging, and washing.

DETAILED DESCRIPTION

The present invention will be further described below in conjunction with a specific application example.

EXAMPLE 1

A method for preparing a starch-based carbon composite was provided, including the following steps:
(1) adding 40 L of glycerol and 1 kg of tungsten chloride to a reactor, and stirring until fully dissolved; then adding 1 kg of sorghum starch and 0.5 kg of thiourea, and thoroughly stirring until mixed well;
(2) placing in a drying oven, setting a temperature at 150° C., and reacting for 15 h;
(3) after cooling, centrifuging for 40 min at 10,000 rpm, washing with tap water, centrifuging for 40 min at 10,000 rpm again, and repeating three times, to collect precipitates; and
(4) drying in the drying oven at 50° C., to obtain modified starch.

EXAMPLE 2

A method for preparing a starch-based carbon composite was provided, including the following steps:
(1) adding 40 L of glycerol and 1 kg of tungsten chloride to a reactor, and stirring until fully dissolved; then adding 1 kg of corn starch and 0.5 kg of thiourea, and thoroughly stirring until mixed well;
(2) placing in a drying oven, setting a temperature at 250° C., and reacting for 5 h;
(3) after cooling, centrifuging for 20 min at 15,000 rpm, washing with tap water, centrifuging for 20 min at 15,000 rpm again, and repeating three times, to collect precipitates; and
(4) drying in the drying oven at 80° C., to obtain modified starch.

EXAMPLE 3

Figure 1:
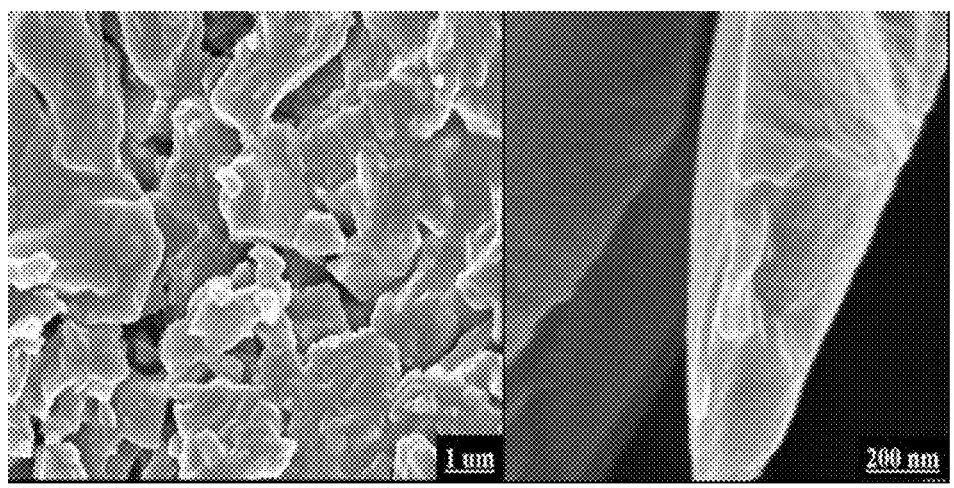
FIG. 1 depicts scanning electron microphotographs.

A method for preparing a starch-based carbon composite was provided, including the following steps:
(1) adding 40 L of glycerol and 1 kg of tungsten chloride to a reactor, and stirring until fully dissolved; then adding 1 kg of potato starch and 0.5 kg of thiourea, and thoroughly stirring until mixed well;
(2) placing in a drying oven, setting a temperature at 200° C., and reacting for 10 h;
(3) after cooling, centrifuging for 30 min at 12,000 rpm, washing with tap water, centrifuging for 30 min at 12,000 rpm again, and repeating three times, to collect precipitates; and
(4) drying in the drying oven at 60° C., to obtain modified starch. The morphology of the starch-based carbon composite prepared is shown in FIG. 1.

APPLICATION EXAMPLE

The starch-based carbon composite provided by the present invention can be used as an adsorbent in adsorbing heavy metal mercury ions and organic pollutants in wastewater. The adsorption step includes: adding the adsorbent modified starch into the wastewater, adjusting pH, controlling adsorption time, and adsorbing heavy metal mercury ions and organic pollutants in wastewater.

To verify the adsorption effect of the adsorbent provided by the present invention, the following experiments were carried out:

1. Preparation of Solutions 2.7218 g of potassium dihydrogen phosphate ($KH_2PO_4 \cdot H_2O$, solution A) was dissolved in 1,000 ml of distilled water, and 4.5644 g of dipotassium hydrogen phosphate ($K_2HPO_4 \cdot 2H_2O$, solution B) was dissolved in 1,000 ml of distilled water. Buffer solutions at different pH were prepared according to the following expression.

Acetate buffer (0.02 M, pH=4): 2.8617 ml of glacial acetic acid was added to 500 ml of distilled water; pH was adjusted with certain concentrations of NaOH solution and acetic acid; then, the resulting solution was poured into a 500 ml volumetric flask to be filled to the pre-marked line.

Acetate buffer (0.02 M, pH=5): 2.8617 ml of glacial acetic acid was added to 500 ml of distilled water; pH was adjusted with certain concentrations of NaOH solution and acetic acid; then, the resulting solution was poured into a 500 ml volumetric flask to be filled to the pre-marked line.

Acetate buffer (0.02 M, pH=6): 2.8617 ml of glacial acetic acid was added to 500 ml of distilled water; pH was adjusted with certain concentrations of NaOH solution and acetic acid; then, the resulting solution was poured into a 500 ml volumetric flask to be filled to the pre-marked line.

Acetate buffer (0.02 M, pH=7): 2.8617 ml of glacial acetic acid was added to 500 ml of distilled water; pH was adjusted with certain concentrations of NaOH solution and acetic acid; then, the resulting solution was poured into a 500 ml volumetric flask to be filled to the pre-marked line.

Preparation of mercury ion solution: 50 mg of mercuric chloride was added to 500 ml of phosphate buffer solution (PBS) (pH=6).

Figure 2:
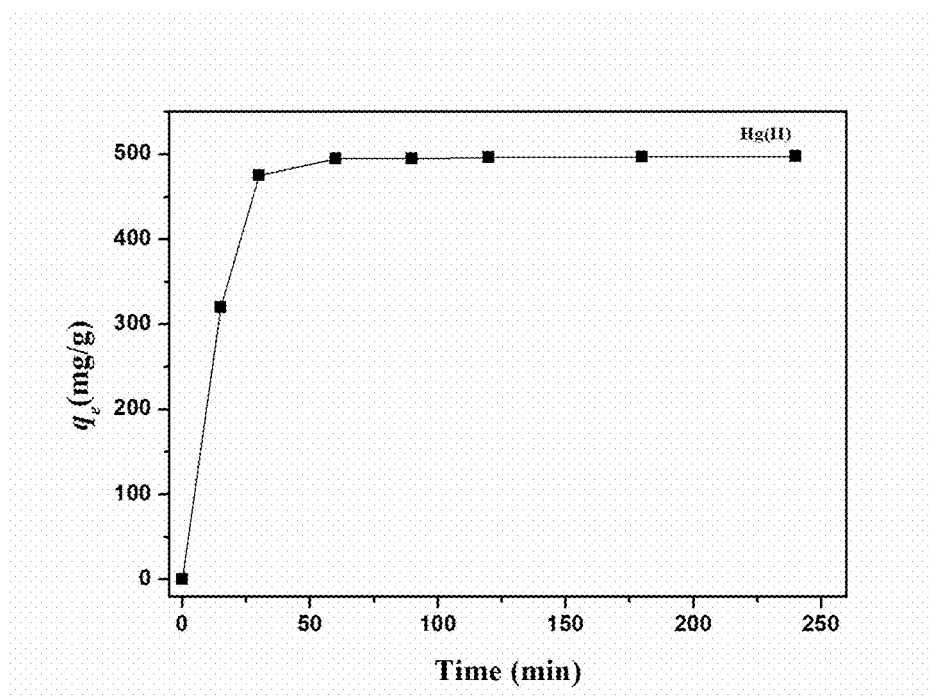
FIG. 2 shows a graph of adsorption capacity of mercury ion versus time.

2. Determination of pH and Time of Adsorption of the Starch-Based Carbon Composite Prepared in Example 3 to Mercury Ion To a 250 ml beaker, 100 ml of the well-prepared mercury ion solution and 0.02 g of modified starch were added, and then stirred in a heat collection type magnetic stirrer; adsorption capacities of modified starch to mercury ions were determined electrochemically at 15 min, 30 min, 1 h, 1.5 h, 2 h, 3h, and 4 h, respectively. As shown in FIG. 2, the adsorption capacity of mercury ions rises sharply to adsorption saturation within 30 min.

After 500 ml each of PBS at different pH (=4, 5, 6, and 7) was prepared, 0.05 g each of mercuric chloride was added thereto; once particles were completely dissolved, 100 ml of the resulting solution was transferred to a 250 ml beaker; 0.02 g of modified starch was added thereto and stirred in the heat collection type magnetic stirrer for 30 min until adsorption thereof was saturated; after standing and centrifugation, adsorption capacities of modified starch to heavy metal mercury ions were determined at different pH by the electrochemical method or atomic absorption spectroscopy.

TABLE 1

Effect of different pH on mercury ion adsorption

|  | pH = 4 | pH = 5 | pH = 6 | pH = 7 |
|---|---|---|---|---|
| Adsorption capacity at 30 min (mg/g) | 275 | 325 | 495 | 425 |
| Removal efficiency at 30 min/% | 55 | 65 | 99 | 85 |

The experimental data indicated that the modified starch had the optimal adsorption effect on adsorption of heavy metal mercury ions when mercury ions were present in the PBS with pH=6 (Table 1).

Figure 3:
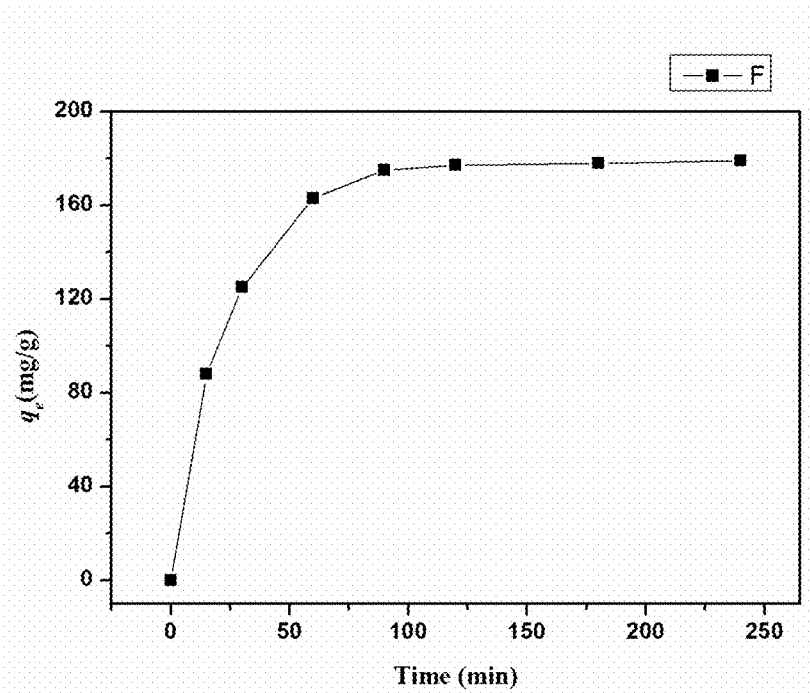
FIG. 3 shows a graph of adsorption capacity of methylene blue versus time.

3. Determination of pH and Time of Adsorption of the Starch-Based Carbon Composite Prepared in Example 3 to Methylene Blue To a 250 ml beaker, 100 ml each of the well-prepared methylene blue solution and 0.03 g of modified starch were added, and then stirred in the heat collection type magnetic stirrer; adsorption capacities of modified starch to methylene blue were determined electrochemically at 15 min, 30 min, 1 h, 1.5 h, 2 h, 3h, and 4 h, respectively. Results are shown in FIG. 3.

After 500 ml each of PBS at different pH (=4, 5, 6, 7, and 8) was prepared, 0.025 g each of methylene blue was added thereto; once methylene blue was completely dissolved, 100 ml of methylene blue solution was transferred to a 250 ml beaker; 0.03 g of modified starch was added thereto and stirred in the heat collection type magnetic stirrer for 1.5 h until adsorption thereof was saturated; after the solution was removed for standing and centrifugation, an approximate amount of supernatant was pipetted, and adsorption capacities of modified starch to methylene blue were determined at different pH by the electrochemical method or atomic absorption spectroscopy.

TABLE 2

Effect of different pH on adsorption of methylene blue

|  | pH = 4 | pH = 5 | pH = 6 | pH = 7 | pH = 8 |
|---|---|---|---|---|---|
| Adsorption capacity at 1.5 h (mg/g) | 85 | 122 | 131 | 160 | 90 |
| Removal efficiency at 1.5 h/% | 34 | 49 | 52 | 64 | 36 |

The experimental data indicated that the modified starch had the optimal adsorption effect on adsorption of methylene blue when methylene blue was present in the PBS with pH=7 (Table 2).

4. The starch-based carbon composites prepared in Examples 1 to 3 were investigated under optimal conditions explored in steps 2 and 3 to compare adsorption capacities of these composites to mercury ions versus methylene blue, as shown in Table 3.

TABLE 3

Comparison of adsorption capacities of starch-based carbon composites prepared in Examples 1 to 3

|  | Mercury ion | Methylene blue |
|---|---|---|
| Example 1 | 486 (mg/g) | 158 (mg/g) |
| Example 2 | 287 (mg/g) | 95 (mg/g) |
| Example 3 | 495 (mg/g) | 160 (mg/g) |

What is claimed:

1. A method for preparing a carbon composite from a starch, the method comprising the following steps:
   (1) adding glycerol and tungsten chloride to a reactor; after dissolving, adding a starch and thiourea thereto, and stirring, wherein a ratio of the tungsten chloride, the glycerol, the starch, and the thiourea is 1 g: 40 ml: 1 g: 0.5 g, respectively;
   (2) reacting at 150-250° C.;
   (3) after cooling, centrifuging and washing to collect precipitates; and
   (4) drying to obtain the carbon composite.

2. The method according to claim 1, wherein the reaction in step (2) is conducted for 5-15 h.

3. The method according to claim 1, wherein the centrifuging in step (3) is conducted for 20-40 min at 10,000-15,000 rpm.

4. The method according to claim 1, wherein the drying in step (4) is performed in a drying oven at a temperature of 50-80° C.

* * * * *